(12) United States Patent
Battey

(10) Patent No.: US 6,234,865 B1
(45) Date of Patent: May 22, 2001

(54) ARTIFICIAL ANTLERS FOR RATTLE BAG

(75) Inventor: Michael Landen Battey, Matthews, NC (US)

(73) Assignee: Ebsco Industries, Inc., Birmingham, AL (US)

( * ) Notice: Subject to any disclaimer, the term of this patent is extended or adjusted under 35 U.S.C. 154(b) by 0 days.

(21) Appl. No.: 09/412,157

(22) Filed: Oct. 5, 1999

(51) Int. Cl.⁷ ..................................................... A63H 5/00
(52) U.S. Cl. ........................................... 446/419; 446/397
(58) Field of Search .................................. 446/397, 418, 446/419; 84/402, 410

(56) References Cited

U.S. PATENT DOCUMENTS

| | | | |
|---|---|---|---|
| 3,570,457 | * | 3/1971 | Curtis .................................... 446/419 |
| 4,179,973 | * | 12/1979 | White .................................... 446/419 |
| 5,138,535 | * | 8/1992 | Aragon, Jr. ............................ 446/419 |
| 5,390,629 | * | 2/1995 | Simone ................................. 446/419 |
| 5,483,859 | * | 1/1996 | Singer .................................. 446/419 |
| 5,659,143 | * | 8/1997 | Isackson ............................... 446/419 |
| 5,777,947 | * | 7/1998 | Ahuja ....................................... 367/1 |
| 5,808,215 | * | 9/1998 | Kralik et al. ......................... 446/419 |

* cited by examiner

Primary Examiner—Sam Rimell
(74) Attorney, Agent, or Firm—Robert J. Veal; Christopher A. Holland; Burr & Forman LLP

(57) ABSTRACT

A deer call for luring a deer to a hunter utilizes a bag in which a plurality of discreet artificial antler components confined within a bag in abutting relationship such that shaking the bag generates noise from the interaction of the components with one another, each component having a plurality of resonators therein to vary the tonal qualities of the component along its length dimensioned to aurally simulate the sound of deer antlers interacting.

25 Claims, 3 Drawing Sheets

ARTIFICIAL ANTLERS FOR RATTLE BAG

FIELD OF THE INVENTION

This invention relates generally to devices for attracting horned mammals and particularly to such devices for attracting deer and elk through the imitation of the sound of clashing antlers.

BRIEF DESCRIPTION OF THE BACKGROUND ART

A known method of attracting antler-bearing animals reproduces or simulates the sound of two deer sparring. In sparring, antler-bearing animals fight with their antlers and foreheads to determine which buck earns the right to the herd and access to reproduction. The sound of antlers rattling can be performed manually by holding an antler in one hand and clashing or lightly striking it into another antler held in the other hand. While actual antlers may be used, numerous varieties of synthetic antlers have been suggested. For example, U.S. Pat. Nos. 4,850,928 and 4,610,641 disclose synthetic antlers. In the '928 patent it was indicated that "while both actual antlers, normally white and weathered from long exposure to the elements, and synthetic antlers as aforesaid have been utilized to attract deer, elk and the like, it has been found difficult to reproduce the sound of animal antlers utilizing synthetic materials." In the '641 patent it was noted that "hunters have known for some time that when deer or elk are in the mating season, bucks take part in a ritual wherein they butt or clash their antlers together." As a result of this ritual, sounds are created which attract other deer or elk, including both bucks and does, to the scene. Hunters have attempted to take advantage of this phenomena by using antlers from previous prizes to simulate the sound of this ritual. The common practice is to cut the horns from the prize, and to clean and sand the horns. The horns are then raked and clashed with one another in order to produce a sound which imitates bucks fighting in the mating ritual. Hunters have had considerable success with these techniques. Deer or elk antlers have certain disadvantages when used by man to attract animals. The antlers tend to lose their "live" sound over time. To overcome this, hunters treat or tune the antlers in an attempt to regain the original sound. Such efforts may involve soaking the antlers in water every two or three days or treating the antlers with linseed oil to keep them from becoming chalky. In addition, the severed antlers do not exhibit stability during varying weather conditions and may produce ineffective sounds depending on the weather.

Devices other than synthetic antlers have been disclosed which simulate the sound of antlers rattling. Such devices are found in U.S. Pat. Nos. 5,334,074 and 5,158,494.

Another commonly used means of simulating the sound of antlers rattling is to place a number of wooden rods in a cloth bag and to strike the bag against an object to cause the clacking sound of antlers rattling. The latter, use of a rattle bag or rattle sack, is growing in popularity; however, merely placing a set of wooden rods in a cloth bag does not provide a realistic acoustic simulation of the sound of animals "rattling" their antlers together.

BRIEF DESCRIPTION OF THE DRAWINGS

An embodiment of the claimed invention is depicted in the accompanying drawings which form a portion of the present disclosure and wherein:

DESCRIPTION OF A PREFERRED EMBODIMENT

Figure 1:
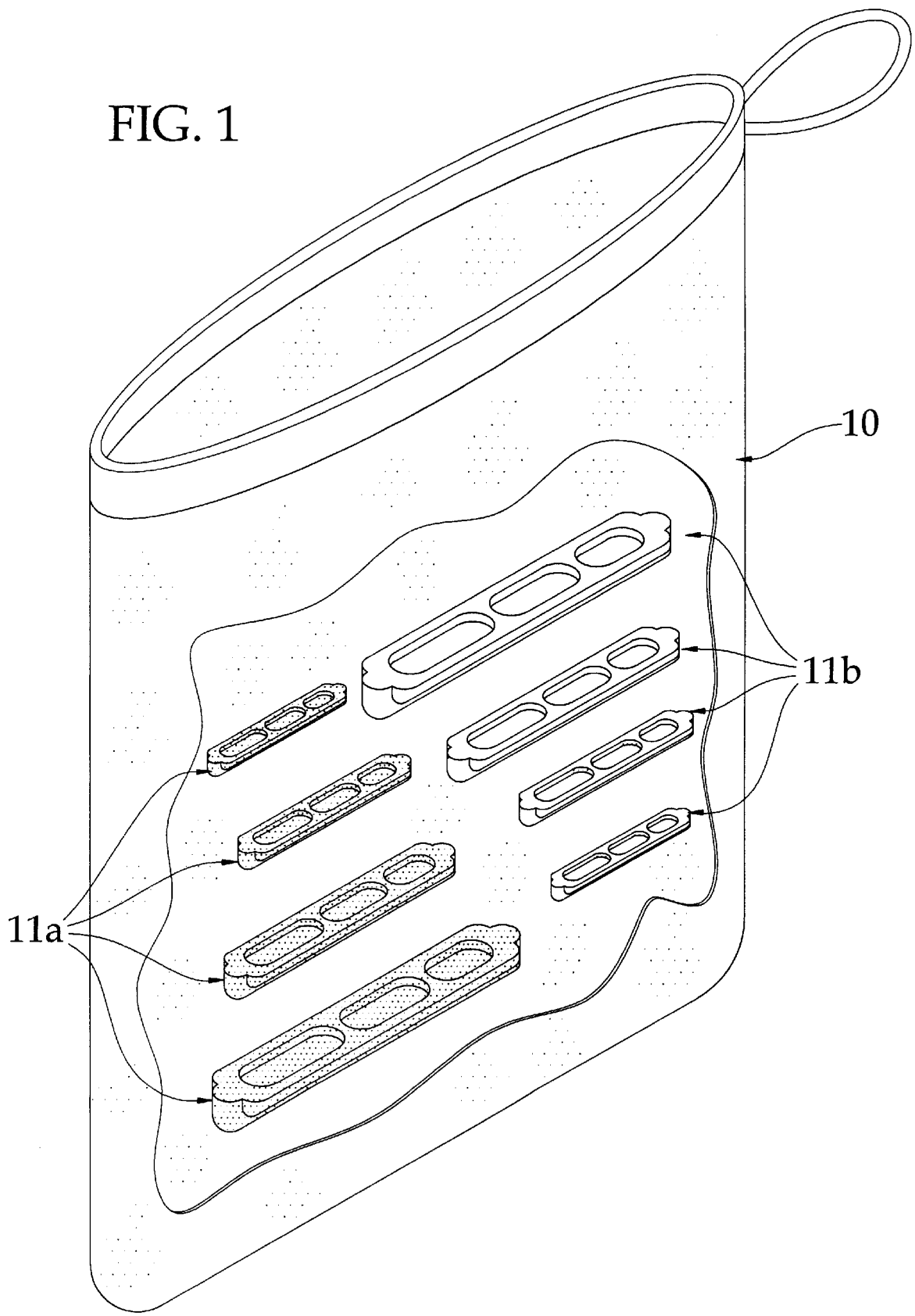
FIG. 1 depicts a bag used with antler components, partially cut away to show the components.
Figure 2:
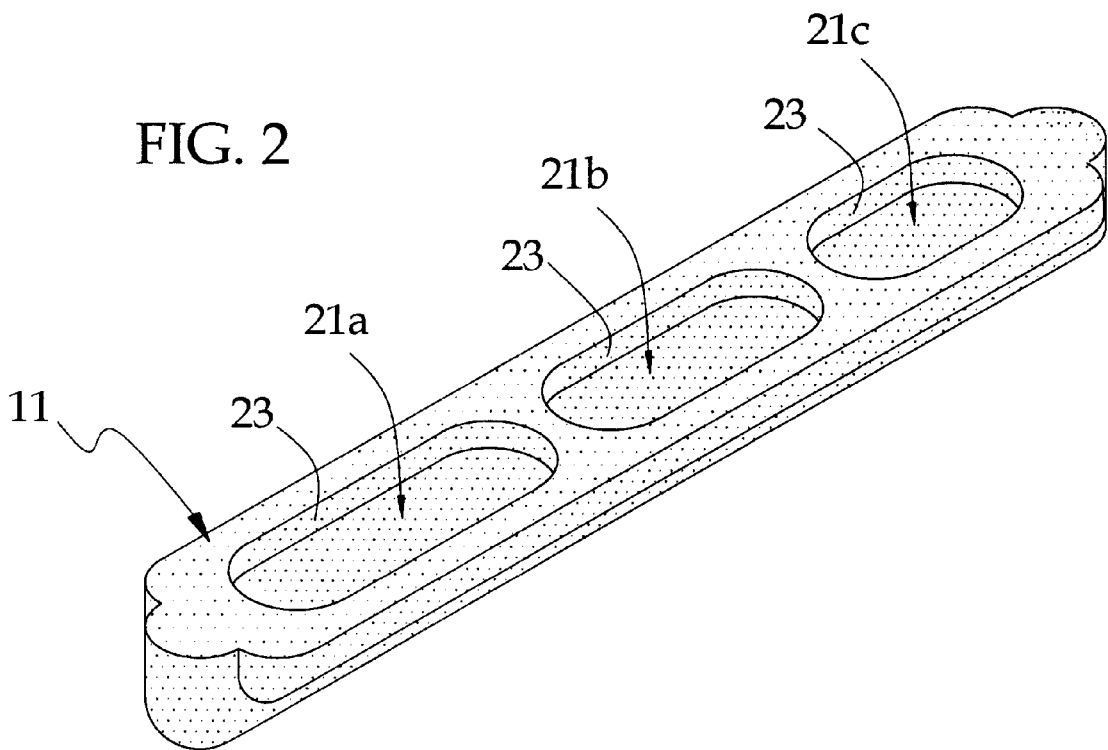
FIG. 2 is a top perspective view of an antler component
Figure 3:
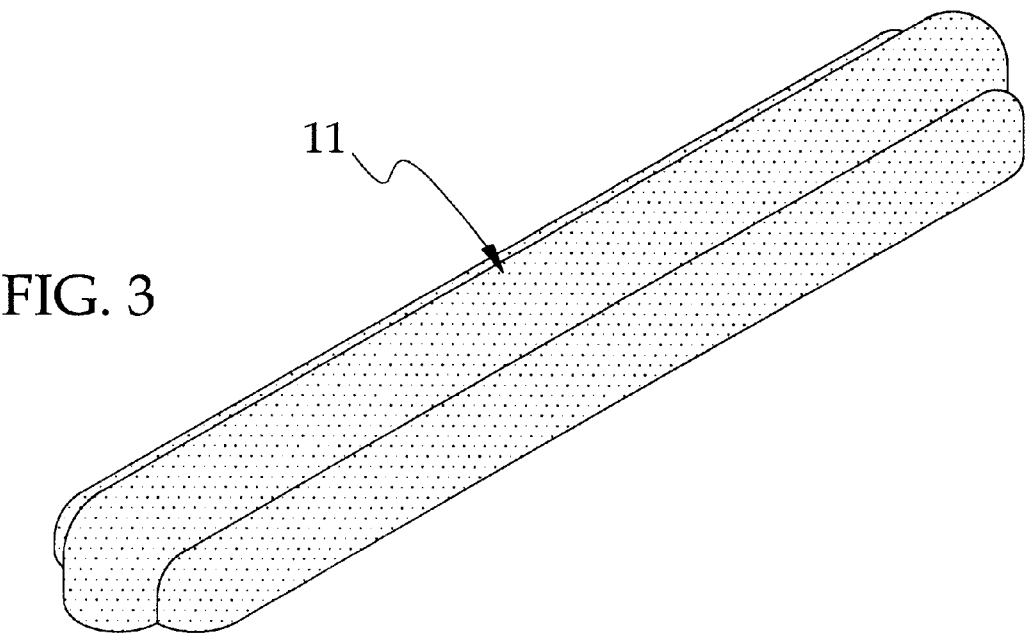
FIG. 3 is a bottom perspective view of an antler component.
Figure 4:
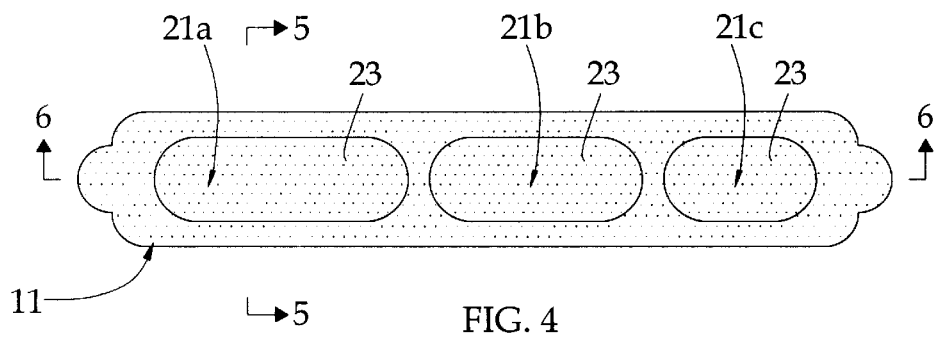
FIG. 4 is a top plan view of a first embodiment of an antler component.
Figure 5:
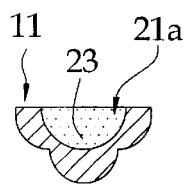
FIG. 5 is a sectional view taken along line 5–5 of FIG. 4.
Figure 6:
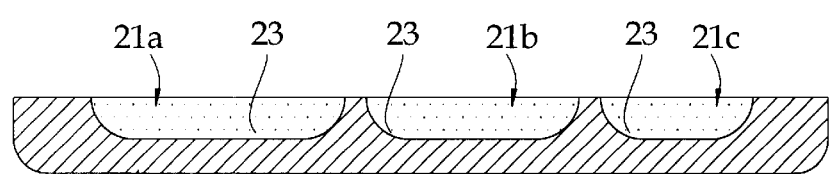
FIG. 6 is a sectional view taken along line 6—6 of FIG. 4.
Figure 7:
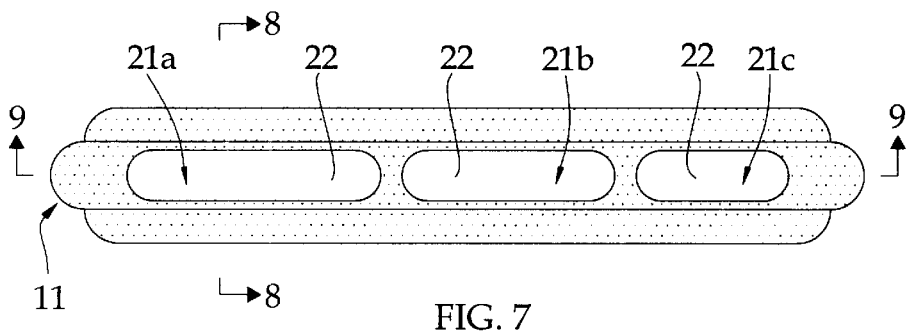
FIG. 7 is a top plan view of an second embodiment of an antler component.
Figure 8:
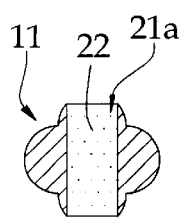
FIG. 8 is a sectional view taken along line 8—8 of FIG. 7.
Figure 9:
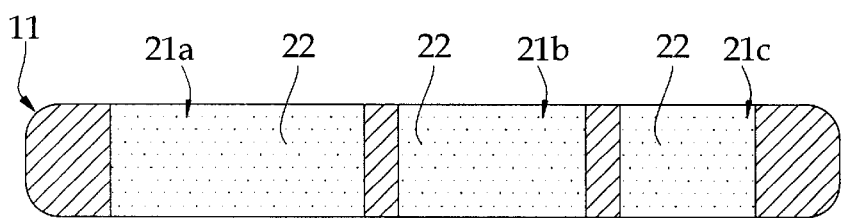
FIG. 9 is a sectional view taken along line 9—9 of FIG. 7.
Figure 10:
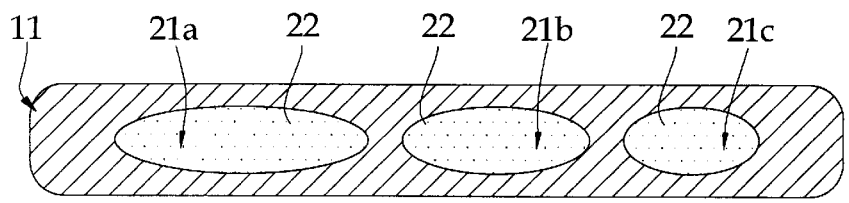
FIG. 10 is a sectional view of a third embodiment of an antler component.

Referring to the drawings for a clearer understanding of the invention, it may be seen in FIG. 1 that the present invention is an improvement to the rattle bag variety of the deer calls. In FIG. 1, bag 10 contains a plurality of artificial antler components 11 comprising strips of plastic or wooden material. Components 11 must replicate the sounds made by the clashing together of antlers of two bucks; thus, it should be appreciated that the antlers of the two combatants will have tines of different lengths and densities and hence will give off vibration in a number of different but closely related frequencies. Accordingly, the components must be selected to likewise provide a varied frequency combination. Inasmuch as the deer can be expected to have antlers which vary slightly in density, I have provided components which vary slightly in density, for example, in the same bag 10, I provide components 11a made from a first plastic selected from a group such as PVC, ABS, an acrylic or other suitable hard plastics and components 11b made from a second plastic selected from the same group of hard plastics. Thus, identically shaped components 11a and 11b will have slightly different tonal characteristics due to the different densities of the plastics.

It is also noteworthy to mention that a deer will have different parts of his antlers which vibrate at different frequencies. For example, a short, small tine will vibrate at a different frequency than a larger tine; a tine with a greater thickness will resonate at a frequency different than one with a lesser thickness. Accordingly, I have provided components within each group of components 11a and 11b that vary in length and thickness. It will be appreciated that the specific length and thickness are matters that are experimentally determined based upon the game animal you are hunting; for example, whitetail deer, mule dear, elk, moose, all have antlers of different sizes and thickness which the present invention may simulate depending on the proper selection of length and thickness.

Also, to account for tonal variation along the length of a tine each component 11 has a plurality of resonators 21 axially spaced along the component 11. The resonators 11 may be elongated apertures 22 or elongated laterally opening chambers 23. It is believed that chambers 23 are preferred, inasmuch as the tonal qualities are closer to those of a natural antler. However, it is noteworthy to mention that the chambers may also be internal with no external opening. It will be appreciated that the variation in length of the resonators provide vibratory structure in the walls of the component in the same manner as any other tuned resonator. That is to say, a longer resonator with thicker wall structure will have a different tonal response than a short thin walled resonator. It should be clear that the length of the resonator can be selected to give the desired range. More specifically, a natural antler may have more than one resonant region; thus, components 11 are provided with a plurality of resonant regions each with a different physical structure, and therefore a different resonant response. In the preferred embodiment, each component will have three resonators, with the longer 21a at one end and the shortest 21c at the other with an intermediate resonator 21b occupying the center of the component. Alternatively, all may have the same length or two resonators of equal length may be formed with one resonator of a distinctly different size and tonal quality. In one embodiment the series of resonators in each strip include a primary resonator 21a at one end of the strip 11 and extending along substantially one-third of the length of said strip 11, a secondary resonator 21b spaced from primary resonator 21a and extending along one-fourth to three-tenths of the length of the component 11, and a tertiary resonator 21c spaced from secondary resonator 21b and extending along one-sixth to one-fifth of the lengths of the simulated antler.

The bag which will thus contain a plurality of antler components is selected from two or more of the following: first set of elongated strips 11a having a series of resonators 21 therein, in which the strips 11a having a first vibrational resonant frequency; a second set of elongated strips 11b having a series of resonators 21 therein, strips 11b having a second vibrational resonant frequency; a third set of elongated strips 11c having a series of resonators 21 therein, strips 11c having a third vibrational resonant frequency; and, a fourth set of elongated strips 11d having a series of resonators therein, with strips 11d having a fourth vibrational resonant frequency; wherein each set comprises at least two of said elongated strips.

What I claim is:

1. An article of manufacture for use in luring deer to a hunter comprising in combination:

a container;

a plurality of discreet antler components confined within said container in abutting relationship such that shaking said container generates noise from the interaction of the components with one another, each component having a plurality of resonators therein to vary the tonal qualities of the component along its length dimensioned to aurally simulate the sound of deer antlers interacting:

wherein said plurality of antler components is selected from two or more of the following:

a first set of elongated strips having a series of resonators therein, said strips having a first vibrational resonant frequency;

a second set of elongated strips having a series of resonators therein, said strips having a second vibrational resonant frequency;

a third set of elongated strips having a series of resonators therein, said strips having a third vibrational resonant frequency; and, a fourth set of elongated strips having a series of resonators therein, said strips having a fourth vibrational resonant frequency;

wherein each set comprises at least two of said elongated strips.

2. An article as defined in claim 1 wherein said series of resonators in each strip of each set comprises three longitudinally spaced apertures with each aperture elongated along the axis of said strip, and each aperture varying in length relative to each other aperture in said strip.

3. An article as defined in claim 1 wherein said series of apertures in each strip include a primary aperture at one end of said strip and extending along substantially one-third of the length of said strip, a secondary aperture spaced from said primary aperture and extending along one-fourth to three-tenths of the length of said strip, and a tertiary aperture spaced from said secondary aperture and extending along one-sixth to one-fifth of the length of said strips.

4. An article as defined in claim 3 wherein each strip in said sets of strips is from about five to about six inches long, from about one-sixth of one inch to about one-fourth of one inch thick and from about one-half-inch to about one and one-tenth inch wide.

5. An article as defined in claim 1 wherein said plurality of discreet antler components includes a first group of components and a second group of components, wherein each component of said first group of components is made from materials having different tonal characteristics than each component of said second group of components, wherein the number of components in said first group of components is substantially equal to the number of components to said second group of components.

6. An article of manufacture for use in luring deer to a hunter comprising in combination:

a container;

a plurality of discreet antler components confined within said container in abutting relationship such that shaking said container generates noise from the interaction of the components with one another, each component having a plurality of resonators therein to vary the tonal qualities of the component along its length dimensioned to aurally simulate the sound of deer antlers interacting;

wherein said plurality of discreet antler components include a number of components made from a first wood having a first wood density and a substantially equal number of components made from a second wood having a second wood density.

7. An article of manufacture for use in luring deer to a hunter comprising in combination:

a container;

a plurality of discreet antler components confined within said container in abutting relationship such that shaking said container generates noise from the interaction of the components with one another, each component having a plurality of resonators therein to vary the tonal qualities of the component along its length dimensioned to aurally simulate the sound of deer antlers interacting;

wherein said plurality of discreet antler components include a number of components made from a first plastic having a first plastic density and a substantially equal number of components made from a second plastic having a second plastic density.

8. An article as defined in claim 6 or 7 wherein each component comprises an elongated strip having a series of apertures therethrough, said series of apertures in each strip comprising three longitudinally spaced apertures with each aperture elongated along the axis of said strip, and each aperture varying in length relative to each other aperture in said strip.

9. An article as defined in claim 8 wherein each component has uniform dimension along the length thereof such that the variation in length of the multiple apertures varies the tonal characteristics of the component from one end to the other.

10. An article as defined in claim 1 wherein said series of resonators in each strip of each set comprises three longitudinally spaced laterally opening chambers with each chamber elongated along the axis of said strip, and each chamber varying in length relative to each other chamber in said strip.

11. An article as defined in claim 1 wherein said series of resonators in each strip include a primary resonator at one end of said strip and extending along substantially one-third of the length of said strip, a secondary resonator spaced from said primary resonator and extending along one-fourth to three-tenths of the length of said strip, and a tertiary resonator spaced from said secondary resonator and extending along one-sixth to one-fifth of the lengths of said strips.

wherein said plurality of discreet antler components include a number of components made from a first plastic having a first plastic density and a substantially equal number of components made from a second plastic having a second plastic density.

12. An improvement in artificial antlers for use in attracting antlered game animals, wherein artificial antlers are confined within a bag and rattled together to simulate the sound contact between the antlers of two antlered animals, the improvement comprising: a plurality of discreet artificial antler components confined within said bag in abutting relationship such that moving the bag generates noise from the interaction of the components with one another, each component having a plurality of resonators therein to vary the tonal qualities of the component along its length dimensioned to aurally simulate the sound of deer antlers interacting with one another;

wherein said plurality of components includes a first and second group of components, wherein each component in said first group is comprised of a first wood selected to have first natural frequency range to simulate the vibration of a first animal's antlers and each component in said second group is comprised of a second wood selected to have a second natural frequency range to simulate the vibration of a second animal's antlers.

13. An improvement in artificial antlers for use in attracting antlered game animals, wherein artificial antlers are confined within a bag and rattled together to simulate the sound contact between the antlers of two antlered animals, the improvement comprising: a plurality of discreet artificial antler components confined within said bag in abutting relationship such that moving the bag generates noise from the interaction of the components with one another, each component having a plurality of resonators therein to vary the tonal qualities of the component along its length dimensioned to aurally simulate the sound of deer antlers interacting with one another;

wherein said plurality of components includes a first and second group of components, wherein each component in said first group comprises a first plastic selected to have first natural frequency range to simulate the vibration of a first animal's antlers and each component in said second group comprises a second plastic selected to have a second natural frequency range to simulate the vibration of a second animal's antlers.

14. An improvement in artificial antlers for use in attracting antlered game animals, wherein artificial antlers are confined within a bag and rattled together to simulate the sounds contact between the antlers of two antlered animals, the improvement comprising: a plurality of discreet artificial antler components confined within said bag in abutting relationship such that moving the bag generates noise from the interaction of the components with one another, each component having a plurality of resonators therein to vary the tonal qualities of the component along its length dimensioned to aurally simulate the sound of deer antlers interacting with one another.

wherein each component comprises an elongated strip having a series of apertures therethrough, said series of apertures in each strip comprising at least two longitudinally spaced apertures with each aperture elongated along the axis of said strip, and each aperture varying in length relative to each other aperture in said strip.

15. An improvement in artificial antlers for use in attracting antlered game animals, wherein artificial antlers are confined within a bag and rattled together to simulate the sounds contact between the antlers of two antlered animals, the improvement comprising: a plurality of discreet artificial antler components confined within said bag in abutting relationship such that moving the bag generates noise from the interaction of the components with one another, each component comprising a strip having a plurality of resonators therein to vary the tonal qualities of the components along its length dimensioned to aurally simulate the sound of deer antlers interacting with one another;

wherein said resonators in each strip include a primary resonator at one end of said strip and extending along substantially one third of the length of said strip, a secondary resonator spaced from said primary resonator and extending along one-fourth to three-tenth of the length of said strip, and a tertiary resonator spaced from said secondary resonator and extending along one-sixth to one-fifth of the length of said strips.

16. An improvement in artificial antlers for use in attracting antlered game animals, wherein artificial antlers are confined within a bag and rattled together to simulate the sounds contact between the antlers of two antlered animals, the improvement comprising: a plurality of discreet artificial antler components confined within said bag in abutting relationship such the moving the bag generates noise from the interaction of the components with one another, each component having a plurality of resonators therein to vary the tonal qualities of the component along its length dimensioned to aurally simulate the sound of deer antlers interacting with one another;

wherein said plurality of discreet antler components is selected from two or more of the following:
(a) a first set of elongated strips having a series of apertures therethrough, said strips having a first vibrational resonant frequency;
(b) a second set of elongated strips having a series of apertures therethrough, said strips having a second vibrational resonant frequency;
(c) a third set of elongated strips having a series of apertures therethrough, said strips having a third vibrational resonant frequency; and
(d) a fourth set of elongated strips having a series of apertures therethrough, said strips having a fourth vibrational resonant frequency;
wherein each set comprises at least two of said elongated strips.

17. An improvement in artificial antlers for use in attracting antlered game animals, wherein artificial antlers are confined within a bag and rattled together to simulate the sounds contact between the antlers of two antlered animals, the improvement comprising: a plurality of discreet artificial antler components confined within said bag in abutting relationship such that moving the bag generates noise from the interaction of the components with one another, each component comprising a strip having a series of resonators therein to vary the tonal qualities of the component along its length dimensioned to aurally simulate the sound of deer antlers interacting with one another;

wherein said series of resonators in each strip of each set comprises three longitudinally spaced laterally opening chambers with each chamber elongated along the axis of said strip, and each chamber varying in length relative to each other chamber in said strip.

18. An improvement in artificial antlers for use in attracting antlered game animals, wherein artificial antlers are confined within a bag and rattled together to simulate the sounds contact between the antlers of two antlered animals, the improvement comprising: a plurality of discreet artificial antler components confined within said bag in abutting relationship such that moving the bag generates noise from the interaction of the components with one another, each component comprising a strip having a plurality of resonators therein to vary the tonal qualities of the component along its length dimensioned to aurally simulate the sound of deer antlers interacting with one another;

wherein said resonators in each strip include a primary laterally opening chamber proximal one end of said strip and extending along substantially one third of the length of said strip, and secondary laterally opening chamber spaced from said primary chamber and extending along one fourth to three-tenth of the length of said strip, and a tertiary laterally opening chamber spaced from said secondary chamber and extending along one-sixth to one fifth of the lengths of said strips.

19. An improvement in artificial antlers for use in attracting antlered game animals, wherein artificial antlers are confined within a bag and rattled together to simulate the sounds of contact between the antlers of two antlered animals, the improvement comprising: a plurality of discreet, substantially rigid, elongated, artificial antler components confined within said bag in abutting relationship such that moving the bag generates noise from the interaction of the components with one another, each component having a variable mass per unit length ratio along its length therein to vary the tonal qualities of the component along its length dimensioned to aurally simulate the sound of deer antlers interacting with one another.

20. The improvement as defined in claim 19 wherein each component comprises an elongated strip having a series of apertures therethrough, said series of apertures in each strip comprising at least two longitudinally spaced apertures with each aperture elongated along the axis of said strip, and each aperture varying in length relative to each other aperture in said strip.

21. The improvement as defined in claim 19 wherein said plurality of components include a number of components having a first natural frequency range to simulate the vibration of a first animal's antlers and a substantially equal number of components having a second natural frequency range to simulate the vibration of a second animal's antlers.

22. The improvement as defined in claim 19 wherein each component has defined therein three longitudinally spaced chambers with each chamber elongated along the axis of said strip, and each chamber varying in length relative to each other chamber in said strip.

23. The improvement as defined in claim 19 wherein each component defines therewithin a primary chamber proximal one end of said component and extending along substantially one-third of the length of said component, a secondary chamber spaced from said primary chamber and extending along one-fourth to three-tenths of the length of said component, and a tertiary chamber spaced from said secondary chamber and extending along one-sixth to one-fifth of the length of said component.

24. The article of manufacture as defined in claim 6, wherein said first wood density differs from said second wood density.

25. The article of manufacture as defined in claim 7, wherein said first plastic density differs from said second plastic density.

* * * * *